Aug. 27, 1929.   L. DE FLOREZ   1,725,782
METHOD AND APPARATUS FOR FLOW CONTROL
Filed Sept. 17, 1925
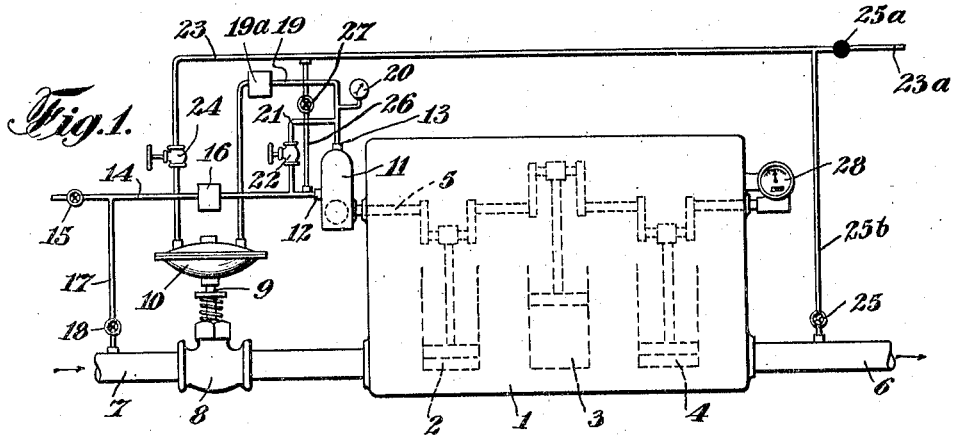
Inventor
Luis deFlorez
By his Attorney
Ramsay Hoquet Patented Aug. 27, 1929.

1,725,782

UNITED STATES PATENT OFFICE.

LUIS DE FLOREZ, OF POMFRET, CONNECTICUT.

METHOD AND APPARATUS FOR FLOW CONTROL.

Application filed September 17, 1925. Serial No. 56,938.

My invention relates to flow control apparatus and more particularly to one where the control is responsive to the movement of a measuring device as determined by the flow of a fluid which is being measured by that device. By relating the control means to the movement of a measuring device actuated by the fluid to be regulated, any changes in the flow resulting from variations in the speed, rate of flow or viscosity of the fluid will effect corresponding changes in the movement of the measuring device to stabilize the flow through the aforesaid control means. In the industrial uses of fluids such as oil distillation, it is not only desirable to measure the quantity but also to establish a predetermined flow and maintain it at that point. The application of my invention aims to fulfill both of these conditions automatically, thus to eliminate any manual control after the initial adjustment. To point out the principle of my invention, I apply it to a displacement piston meter having registering means such as a revolution counter and where the speed of the meter or measuring device resulting from the fluid flow actuates a pump to cause an independent pressure to act upon a diaphragm valve in proportion to the rate at which the meter drives the pump and as changes in the speed, pressure or viscosity of the fluid will vary the movement of the meter accordingly, such variations will be translated to the control means to maintain a constant flow. Similarly the speed of the meter may be used in connection with a governor which in turn regulates a hydraulically operated control device or such speed may be used in conjunction with a speed standard through a mechanical movement wherein the control device is affected by the difference between the two speeds. Other and further advantages will appear in the following specification of which the drawings form a part. In these drawings, Fig. 1 shows an elevation of a displacement meter arranged for pressure control of a regulating valve.

Fig. 2 shows an elevation of a displacement meter arranged with a governor controlled hydraulic valve.

Fig. 3 shows an elevation of a displacement meter arranged for a speed differential between the meter and an escapement.

In Fig. 1, I show a displacement or piston meter at 1 in which are measuring cylinders such as 2, 3 and 4, the pistons of which drive the shaft 5 as is well known in this type of meter. The fluid discharge pipe from the meter is at 6 while the corresponding inlet pipe is at 7 in which is a control valve 8 of the pressure type having the usual spring acting spindle 9 and the diaphragm housing 10. Adjacent to the meter 1 and arranged to be driven by the shaft 5 is a pump 11 which has an inlet 12 and a discharge 13. The pipe 14 leads to the pump inlet 12 and has in it the valve 15 and the equalizing chamber 16, the purpose of which is to assure an adequate supply of fluid to the pump 11, particularly in the closed circuit operation to be described hereafter, as well as to smooth out any inequalities of flow in the pipe 14. This pipe 14 may lead from an independent source of liquid with which the flow in pipe 6 is to be correlated or it may be connected to pipe 7 by the branch 17 in which is the valve 18. Coming from the discharge 13 of the pump 11 is a pipe 19 which leads to the diaphragm housing 10 of the valve 8. In this pipe 19 I place a pressure gauge 20 and also a chamber 19$^a$ which serves to smooth out any pulsations or inequalities in the discharge of the pump 11. A by-pass 21 having a valve 22 is connected around the pump 11, and a pipe 23 having a valve 24 provides an outlet from the diaphragm housing 10. The pipe 23 has two branches 23$^a$ and 25$^b$, the former leading to an independent discharge point and being provided with a valve 25$^a$, and the latter connecting with the pipe 6 and controlled by a valve 25. I may connect the pipe 23 and the inlet 12 of the pump by a pipe 26 having a valve 27. Also, on the shaft 5 of the meter 1, I place a revolution counter 28 directly connected to that shaft.

In the application of my invention in one of the preferred forms as just described, the flow of the liquid through the pipe 7 will cause the meter to move and rotate the shaft 5 so that the revolution counter 28, the capacity of the cylinders 2, 3 and 4 being known, will measure the volume of liquid passing through the meter 1. Assuming at first that the valves 15, 22, 27 and 25$^a$ are closed while the others are open, there is formed a system of the pipes 17, 14 and 19, 23 and 25$^b$. As the pump 11 is driven by the shaft 5, the liquid taken in by it through the pipes 17 and 14 will be discharged through the pipe 19 to the space over the diaphragm in the housing 10 and out through the pipes 23 and 25ᵇ to the discharge pipe 6. It will be understood that any fluctuations of flow in the pipe 7 due to changes of speed or pressure of the fluid or any change in the viscosity will correspondingly affect the flow of in the pipes 17 and 14 to vary the feed of fluid to the pump 11. Therefore, if the viscosity is lowered or the speed or pressure increased in the pipe 7, more fluid will flow to the pump 11 through the pipes 17 and 14 and the meter 1 will increase its speed as will also the pump 11. Consequently more fluid will be passed through the pipe 19 to the diaphragm housing 10 and as the pipe 23 is of constant opening, the increase of fluid over the diaphragm will build up a pressure there and the valve 8 will begin to close. As this occurs, the speed of the meter is reduced until a point is reached where the pump develops just enough pressure over the diaphragm in the housing 10 to hold the valve in position. Therefore, whatever change occurs in the flow in the pipe 7 is reflected through the meter and pump to the diaphragm of the valve 8 and there compensated for; it being evident that if the viscosity becomes higher or the pressure or speed falls in the pipe 7, the reverse action takes place; that is, the meter slows down, the pressure over the diaphragm of the valve 8 is lowered and the valve will open to pass more fluid and establish the predetermined flow. Consequently, the flow is constantly and automatically being corrected for any variation from the desired amount. If it is desired to regulate the flow in relation to an exterior source, the valve 18 is closed and the valve 15 opened, the pipe 14 in this case leading directly to the exterior source of fluid. The pump may be eliminated entirely by opening the valve 22 so that pressure either from the pipe 7 or the exterior source will act directly upon the diaphragm of the valve 8 and be unaffected by the speed of the meter. Similarly a closed circuit may be formed by shutting the valves 15, 18, 22, 25ᵃ and 25 and opening valve 27. In this case the pump 11 would circulate the same fluid through pipe 19 to the diaphragm housing 10, out through pipe 23 and back through pipe 26 to the pump inlet so that the pressure regulation of the valve 8 would be entirely a function of the speed of the meter 1. It will be noted that in this instance of the closed circuit that the chamber 16 serves to maintain an adequate supply of fluid for the inlet of the pump and further tends to smooth out any inequalities of flow. In all of the foregoing it will be noted that the flow may be set by controlling the fluid to the pump 11 by valves 18 or 15, or similarly, by controlling the discharge from the diaphragm housing 10 through the valve 24 or 25, the pressure gauge or speed indicator 20 measuring the pump pressure or speed and thus the position of valve 8. Furthermore, if it occurs that the pressure in pipe 6 be too high or another point of discharge desired, the valve 25 may be closed and valve 25ᵃ opened to pass the discharge of pipe 23 through pipe 23ᵃ and in this case, the valve 25ᵃ could exercise the same degree of control as valve 25. It is also to be noted that the valve 22 controls the opening of by-pass 21 and so may be used to supplement the flow of fluid past the pump to compensate for changes of pressure and viscosity of the fluid going through the meter.

In Fig. 2 I show a variation of my invention wherein the speed of the meter controls a hydraulic valve under the action of a governor. In this case, the shaft 5 extends beyond the meter 1 and has loosely placed on it a coil spring 29, one end of which is fixed to the shaft 5 and the other end to the bevel gear 30. This bevel gear is mounted upon but not fixed to the shaft 5; the spring 29 forming the driving connection between shaft 5 and the gear 30. In mesh with the gear 30 is another bevel gear 31 which is attached to and drives the shaft 32 of a governor; in this instance, one of the fly-ball type. The sleeve 33 of this governor forms a bearing for one end of the lever 34, the other end of which is pivotally connected to the dashpot 35. The lever 34 has a pivoted connecting link 36 which connects with the piston 37 of the hydraulic valve 38, this valve having an inlet pipe 39 and an exhaust pipe 40, ports 41 and 42 opening into the cylinder 43 and passages 44, 45 and 46 through which the liquid passes according to the position of the piston 37. The cylinder 43 has a piston 47 and a piston rod 48 connected to the lever 49 which is pivoted to the bracket 50 and to the valve stem 9 while the link 51 pivotally connects both of the levers 49 and 34. The above mentioned inlet pipe 39 has a branch 52 leading to the main pipe 7 and which is controlled by the valve 53 and also an extension 54 controlled by the valve 55, it being the purpose of this extension to utilize a source of liquid exterior to the pipe 7 if so desired. The exhaust pipe 40 terminates in two branches, one 56 going to the pipe 6 and controlled by the valve 59 and the other branch 57 going to any suitable place of exhaust and controlled by the valve 58. Then assuming that the governor has been set for the correct flow, the vertical position of the sleeve 33 would be such that the ports 41 and 42 would be closed by the piston 37, the piston 47 would be held stationary because of the fluid above and below it and no change will occur in the valve 8. However, if any change occurs in the viscosity, speed or pressure of the liquid flowing in pipe 7, the speed of the meter 1 will change accordingly. If the meter speed should fall due to a change in flow conditions in pipe 7, the governor would slow down and the sleeve 33 would drop accordingly and because of the consequent depression of the lever 34, the piston 37 would assume a position somewhat as shown in Fig. 2. Therefore, liquid from the inlet pipe 39 would flow through the passage 45 and the port 41 to the cylinder 43 above the piston 47 to force it downward while the exhaust fluid from below this piston would flow through the port 42, the passages 44 and 46 and out through the exhaust pipe 40. As the piston 47 moves down, the lever 49 is rocked and the opening of the valve 8 increased by the raising of the stem 9 to increase the flow in pipe 7. As the lever 49 is rocked and the stem 9 is raised, the link 51 moves upward to raise the lever 34 against the resistance of the dashpot 35; it being evident that the other end of the lever 34 cannot move as it is held in its position by the governor. Therefore the link 51 will force the lever 34 to pivot about its end which is held in the sleeve 33 and in so doing, the link 36 will move upward with the lever 34 and the piston 37 be carried with it to a position where the ports 41 and 42 are closed. Consequently no further movement of the piston 47 would take place and the valve 8 would remain in its new position. A similar result follows when the conditions of flow in pipe 7 change so that the speed of the meter is increased. Then the piston 37 would rise as the speed of the governor rose, liquid would flow below the piston 47 to raise it and close the valve 8, followed by the closing of the ports 41 and 42 as lever 34 is pulled down by the link 51 and the retention of valve 8 in its more closed position. It will thus be seen that the action of the governor, the hydraulic valve and the link motion is one where corrections are applied to the valve 8 in stated amount and that there is no hunting of the valve. A correction is applied which is proportioned to the movement of the governor and when once applied, is not carried beyond either above or below the required amount but is stopped at the proper point. The function of the spring 29 is that of a resilient driving connection between the shaft 5 and the gear 30 so that any sudden change in the speed of the meter will be taken up gradually by the spring and no sudden strain is put upon the governor or its mechanism.

In Fig. 3 I show still another variation but in this instance the control of the flow is governed entirely by the speed of the meter; no hydraulic or pressure means being used. Upon the shaft 5 which is extended from the meter 1 as shown is mounted a gear mechanism which varies the flow in the pipe 7 by a differential of speed between the meter and a speed standard which I illustrate with a time controlled escapement. On the outer end of shaft 5 is a coil spring 60, one end of which it attached to a collar 61 fixed to the shaft 5 and the other end of which is attached to a clutch member 62 loosely mounted on shaft 5 and which has a seat in the bevel gear 63. This bevel gear together with the double bevel gear 64, both being loosely mounted on shaft 5, are parts of a differential which also includes the fixed pinions 65 and 66 which turn on the spindles 67 and 68 held in the members 69 and 70. Fixed to the spindle 67 is an escapement gear 71 having an escapement 72 normally held downward by the spring 73. Adjacent to and adapted to actuate the escapement 72 is an electromagnet 74 which is periodically energized by a time device such as is shown at 75; the necessary source of current being shown at 75ª. The gear 76 is fixed to the shaft 5 and with the double gear 64, form parts of a second differential, the pinions 77 and 78 of which are mounted on the ring gear 79. This ring gear 79 meshes with a spur gear 80 which is fixed to the spindle 9 of the valve 8 so that any movement of the ring gear 79 will accordingly open or close the valve 8. In operation, the time device 75 is set to energize the electromagnet 72 at certain time intervals which may be as desired within the limits of the particular time device used. Therefore the escapement will be oscillated about its bearing accordingly to permit a corresponding movement of the escapement gear 71 and permit the rotation of pinion 65 at a constant speed for that particular setting of the time device 75. The meter 1 will drive its shaft 5 at a speed dependent upon the flow in pipe 7 and the collar 61 being fixed to this shaft and to the spring 60, the resiliency of the spring 60 will be taken up to the point where the clutch 62 and its gear 63 will tend to turn at the speed of shaft 5 but the pinions 65 and 66 being fixed and pinion 66 being controlled in its rotation as aforesaid, the double gear 64 must necessarily rotate at the same speed as gear 63. The gear 76 being fixed to the shaft 5, it will have the same speed as that shaft under all conditions. Therefore as long as gear 64 (which has its speed determined by the time device or speed standard 75) and gear 76 (which has the speed of shaft 5) continue to rotate in opposite directions but at the same speed, there will be no change in the position of the ring gear 79; that is, there is no differential of speed and no change will take place in the setting of the valve 8. However, if a change of speed, pressure or viscosity occurs in the flow through pipe 7, the meter 1 will change speed accordingly and drive the gear 76 faster or slower as the case may be. This being so and the gear 64 being held at a set speed, there will be a speed differential between the two gears which will cause the ring gear 79 to rotate and drive the spur gear 80 and open or close the valve 8 depending upon the direction of rotation of the spur gear 79 as determined by the change in speed of gear 76. This control of the flow through pipe 7 by the valve 8 will continue until it is established at a point where the meter 1 drives the shaft 5 at a rate which makes the speed of gear 76 equal to that of gear 64 and the ring gear 79 remains stationary. The function of the coil spring 60 is that of storing energy for the reason that if the speed of the meter should fall and the shaft 5 run below the speed established for the double gear 64, reserve power must be available to maintain this standard speed and it is from the wound up spring 60 that it is taken for this purpose. As soon as the proper speed of the meter is again brought about, the spring is again rewound and ready for use in any subsequent lowering of the meter speed. If the speed of the meter becomes too great and the spring 60 cannot absorb the excess, the clutch 62 is so adjusted that it will slip at the proper point of power and will so continue to slip until the meter speed falls to where normal driving through the spring 60 can be resumed. It will be noted that this clutch arrangement not only takes care of any sustained increase of meter speed but also prevents damage to the mechanism in case of a great or unusual rise in the speed of the meter. The foregoing description shows how I also apply my invention through the medium of a mechanism utilizing a speed differential and control the flow of a fluid in accordance with the speed of a measuring device.

Therefore the foregoing description of the selected embodiments of my invention shows how it may be applied for the control of the flow of a fluid by means responsive to the movement of a measuring device which is actuated by the fluid to be controlled.

It will be evident from the disclosure of the principle of my invention that many changes and variations can be made without departing from the spirit thereof and I include within the scope of my claims all such changes and variations.

I claim:

1. The method of flow control for fluids which comprises utilizing the speed of a flow measuring device to drive a pump and utilizing the pressure created by said pump to act upon a flow regulating device whereby it is varied in accordance with the speed of the flow measuring device.

2. The method of flow control for fluids which comprises regulating the flow in accordance with pressures derived from the movement of a measuring device actuated by the fluid to be regulated.

3. The method of flow control for fluids which comprises causing the fluid to be regulated to actuate a measuring device, translating that movement into pressure and causing that pressure to act upon the fluid regulating device.

4. The method of flow control for fluids which comprises regulating the flow by hydraulic means responsive to the movement of a measuring device actuated by the fluid to be regulated.

5. In an apparatus for flow control, means to measure the flow, means actuated by the movement of the measuring means to create a pressure and means to regulate the flow in response to the pressure.

6. In combination, a pipe through which there is a flow of fluid, a displacement meter in said pipe, a valve controlling the rate of fluid-flow through said pipe, and means for governing said valve by the speed of said displacement meter.

7. In combination, a pipe through which there is a flow of fluid, a displacement meter associated with said pipe so that its speed varies with the rate of fluid-flow through said pipe, a valve controlling the rate of fluid-flow through said pipe, and means for governing said valve by the speed of said displacement meter.

8. Apparatus for regulating the flow of liquids, comprising in combination, a pipe through which there is a flow of liquid, a displacement meter in said pipe, a flow regulating valve in said pipe, a pump adapted to be driven by said meter, and means for operating said valve in accordance with the pressure produced by said pump.

9. Apparatus for regulating the flow of liquids, comprising in combination, a pipe through which there is a flow of liquid, a flow regulating valve in said pipe, a displacement meter in said pipe, a pump adapted to be driven by said meter, means for supplying said pump with liquid from said pipe, and means for operating said valve in accordance with the pressure produced by said pump.

10. Apparatus for regulating the flow of liquids, comprising in combination, a pipe through which there is a flow of liquid, a displacement meter in said pipe, a pump adapted to be driven by said meter, a fluid operated diaphragm pressure valve in said pipe, and a connection between said pump and said valve, whereby the valve is operated in accordance with the pressure produced by the pump.

11. Apparatus for regulating the flow of liquids, comprising in combination, a pipe through which there is a flow of liquid, a displacement meter in said pipe, a pump adapted to be driven by said meter, means for supplying said pump with liquid from said pipe, a fluid operated diaphragm pressure valve in said pipe, and a connection between said pump and said valve, whereby the valve is operated in accordance with the pressure produced by the pump.

12. In combination, a pipe through which there is a flow of fluid, a displacement meter in said pipe, a valve controlling the rate of fluid-flow through said pipe, and means supplied with fluid from said pipe for governing said valve by the speed of said displacement meter.

13. In combination, a pipe through which there is a flow of fluid, a displacement meter associated with said pipe so that its speed varies with the rate of fluid-flow through said pipe, a valve controlling the rate of fluid-flow through said pipe, and means supplied with fluid from said pipe for governing said valve by the speed of said displacement meter.

14. In combination, a pipe through which there is a flow of fluid, a displacement meter in said pipe, a valve controlling the rate of fluid-flow through said pipe, and means influenced by fluid continuously in circulation for governing said valve by the speed of said displacement meter.

In testimony whereof, I have signed my name to this specification this 26th day of August 1925.

LUIS DE FLOREZ.